US012562433B2

(12) United States Patent
Shimomori et al.

(10) Patent No.: US 12,562,433 B2
(45) Date of Patent: Feb. 24, 2026

(54) SEPARATOR FOR LEAD ACID BATTERY

(71) Applicant: Nippon Sheet Glass Company, Limited, Tokyo (JP)

(72) Inventors: Ken Shimomori, Tokyo (JP); Keita Mori, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 833 days.

(21) Appl. No.: 17/057,233

(22) PCT Filed: Apr. 11, 2019

(86) PCT No.: PCT/JP2019/015840
§ 371 (c)(1),
(2) Date: Nov. 20, 2020

(87) PCT Pub. No.: WO2019/225199
PCT Pub. Date: Nov. 28, 2019

(65) Prior Publication Data
US 2021/0143509 A1 May 13, 2021

(30) Foreign Application Priority Data

May 25, 2018 (JP) ................................. 2018-100550

(51) Int. Cl.
| | |
|---|---|
| *H01M 50/44* | (2021.01) |
| *H01M 10/06* | (2006.01) |
| *H01M 50/403* | (2021.01) |
| *H01M 50/409* | (2021.01) |
| *H01M 50/449* | (2021.01) |
| *H01M 50/494* | (2021.01) |

(52) U.S. Cl.
CPC ......... *H01M 50/44* (2021.01); *H01M 50/403* (2021.01); *H01M 50/409* (2021.01); *H01M 50/449* (2021.01); *H01M 50/494* (2021.01); *H01M 10/06* (2013.01)

(58) Field of Classification Search
CPC .. H01M 50/44; H01M 50/403; H01M 50/409; H01M 50/449; H01M 50/494; H01M 10/06
See application file for complete search history.

(56) References Cited

U.S. PATENT DOCUMENTS

| | | | |
|---|---|---|---|
| 9,293,748 B1 | 3/2016 | Ashirgade | |
| 9,577,236 B2 | 2/2017 | Ashirgade | |
| 9,627,668 B1 | 4/2017 | Ashirgade | |
| 9,728,756 B2 | 8/2017 | Ashirgade | |
| 10,431,796 B2 | 10/2019 | Ashirgade | |
| 2004/0265513 A1* | 12/2004 | Tamagawa | G03G 7/006 |
| | | | 162/122 |
| 2006/0281008 A1 | 12/2006 | Mitani | |
| 2016/0079581 A1 | 3/2016 | Ashirgade | |
| 2016/0164058 A1 | 6/2016 | Ashirgade | |
| 2017/0092917 A1 | 3/2017 | Ashirgade | |
| 2017/0170442 A1 | 6/2017 | Ashirgade | |
| 2018/0026247 A1 | 1/2018 | Ashirgade | |

FOREIGN PATENT DOCUMENTS

| | | | | |
|---|---|---|---|---|
| CN | 102549805 A | * | 7/2012 | ............ H01M 2/145 |

OTHER PUBLICATIONS

J Cook et al. Alkaline Battery Separators—Encyclopedia of Electrochemical Power Sources, 2009 (Year: 2009).*
Machine translation of CN 102549805 A (Year: 2012).*
See, e.g., Verma, et. al., Fuzzy Rule Based Optimization in Machining of Glass Fiber Polymer Composites, National Institute of Technology Rourkela, p. 13, (2012). (Year: 2012).*
Extended European Search Report for European Patent Application No. 19807166.4 dated Feb. 21, 2022 (7 sheets).

* cited by examiner

*Primary Examiner* — Matthew T Martin
*Assistant Examiner* — Krishna R Hammond
(74) *Attorney, Agent, or Firm* — Kratz, Quintos & Hanson, LLP

(57) ABSTRACT

[Problem] A separator for a valve-regulated lead acid battery that has suppressed losing the thickness (reduction of compressive force) of the separator and prolonged a cycle lifetime is provided.
[Solution] The separator for a valve-regulated lead acid battery includes a sheet formed through wet papermaking mainly containing glass fibers, and has an MD/CD strength ratio shown by the following expression (1) of 1.5 or less and 60 kPa compressive force in liquid immersion shown by the following expression (2) of 65% or more:

MD/CD strength ratio=MD strength/CD strength    (Expression 1)

60 kPa compressive force in liquid immersion(%)
(pressure force after liquid immersion/compressive force in liquid immersion)×100.    (Expression 2)

5 Claims, No Drawings

SEPARATOR FOR LEAD ACID BATTERY

TECHNICAL FIELD

The present invention relates to a separator for a valve-regulated lead acid battery. In more detail, the present invention relates to a separator for a valve-regulated lead acid battery that is used for a cycle application with repeated discharge and charge, and has sufficient followability to expansion and contraction of an electrode plate and a prolonged cycle lifetime, by enhancing the compressive force in liquid immersion and the pressure force maintenance rate.

BACKGROUND ART

For enhancing the characteristics and the lifetime of a valve-regulated lead acid battery, it is being considered that the losing the thickness (reduction of compressive force) of the separator is desirably suppressed. As measures for enhancing the pressure force of a separator formed of glass fibers, for example, it has been known that the losing the thickness (reduction of compressive force) can be reduced by uniformly filling silica powder having an average particle diameter of 0.4 to 3 μm formed through wet pulverization of silica powder, in a sheet formed of 10 to 90 wt % of glass fibers and 0 to 10 wt % of synthetic fibers (see PTL 1). It has also been known that the pressure force can be retained by improving the cushioning property of the separator in such a manner that 1 to 10 wt % of expandable microcapsules of 40 to 100 μm (preferably polyacrylonitrile) are mixed and subjected to wet papermaking (see PTL 2).

CITATION LIST

Patent Literatures

PTL 1: JP-A-9-134716
PTL 2: JP-A-2007-95372

SUMMARY OF INVENTION

Technical Problem

However, the aforementioned background art has the following problems.

For enhancing the high-sate discharge characteristics, i.e., the short-time large-current discharge capability, it is necessary to move the electrolyte held by the separator, rapidly to the electrode plate side. Accordingly, the separator is demanded to have a high electrolyte absorbing capability and a high electrolyte holding capability, but the addition of synthetic fibers, silica powder, or expandable microcapsules to a glass fiber sheet deteriorates the affinity (wettability) to the electrolyte as compared to a sheet formed only, of glass fibers, resulting in decrease of the electrolyte absorbing capability and the electrolyte holding capability. Furthermore, the addition of silica powder to a glass fiber sheet provides a clogged sheet having a decreased porosity inside the sheet, resulting in decrease of the electrolyte retention amount.

In glass fibers that are subjected to papermaking under ordinary papermaking conditions, the glass fibers tend to be oriented in the papermaking direction, and the glass fibers are disposed on a horizontal plane. As a result, a surface tension occurs in one direction in liquid immersion, resulting in a state where the sheet tends to collapse in the thickness direction and tends to suffer the losing the thickness (reduction of compressive force).

The present invention has been made under the circumstances, and an object thereof is to provide a separator for a valve-regulated lead acid battery that has suppressed losing the thickness (reduction of compressive force) of the separator and prolonged a cycle lifetime, by enhancing the compressive force in liquid immersion and the pressure force maintenance rate without decrease of the electrolyte absorbing capability and the electrolyte holding capability.

Solution to Problem

As a result of the earnest investigations for solving the problem, as for a separator for a valve-regulated lead acid battery including a sheet formed through wet papermaking mainly of glass fibers, it has been found with the MD/CD strength ratio used as one index of the fiber orientation, a sheet having a smaller MD/CD strength ratio (i.e., having a more random orientation) has a high compressive force in liquid immersion and a high pressure force maintenance rate.

More specifically, in a sheet formed through wet papermaking mainly of glass fibers subjected to papermaking under ordinary papermaking conditions, since the glass fibers tend to be oriented in the papermaking direction, and the glass fibers are disposed on a horizontal plane, a surface tension occurs in one direction in liquid immersion, and the sheet tends to collapse in the thickness direction. However, in the case where the glass fiber orientation is randomized by changing the papermaking conditions, it has been confirmed that the surface tension, which is a factor of the decrease of the pressure force, can be dispersed in many directions, so as to suppress the losing the thickness (reduction of compressive force) of the separator. In addition, it has been confirmed that the glass fibers overlap largely with each other, and thus the losing the thickness (reduction of compressive force) of the glass fibers can be mechanically suppressed.

The followings have been confirmed based on the aforementioned knowledge.

(1) By making the jet-wire ratio of the paper machine close to 1, in accumulating glass fibers, at the time when one end of the glass fiber reaches the surface of the forming wire, the glass fibers are not immediately pulled in the moving direction of the forming wire, and thus can be subjected to papermaking with random fiber orientation, which may bring about the enhancement of the pressure force.

(2) By increasing the inclination angle in the papermaking, in accumulating glass fibers on the surface of the forming wire, the proportion of glass fibers that are in the vertical direction with respect to the horizontal plane can be increased, resulting in the enhancement of the pressure force.

(3) In the case where the MD/CD strength ratio shown by the following expression (1) is 1.5 or less, and the 60 kPa compressive force in liquid immersion shown by the following expression (2) is 65% or more, the cycle lifetime can be prolonged:

$$\text{MD/CD strength ratio=MD strength/CD strength} \quad \text{(Expression 1)}$$

(wherein the sheet formed through wet papermaking cut in a direction in parallel to the flow direction in the papermaking to a length of 15 cm and a width of 2.5 cm is designated as an MD specimen, and the sheet formed through wet papermaking cut in a direction perpendicular to the flow direction in the papermaking to a length of 15 cm and a width of 2.5 cm is designated as an CD specimen, which are measured with a tensile tester under conditions of a chuck distance of 10 cm and a tensile speed of 25 mm/min, and the maximum breaking strengths of the MD specimen and the CD specimen are designated as the MD strength and the CD strength respectively).

60 kPa compressive force in liquid immersion(%)=
(pressure force after compressive force in liquid immersion/compressive force in liquid immersion)×100 (Expression 2)

(wherein 10 sheets of the sheet formed through wet papermaking of 10 cm×10 cm are designated as a specimen, which is sandwiched between a fixed plate and a movable plate, the movable plate is moved toward the fixed plate at a moving speed of 1 mm/min to compress the sheet under pressure of 60 kPa, which is designated as the compressive force in liquid immersion, and the pressure force of the specimen after immersing in a sulfuric acid solution having a specific gravity of 1.3 and allowing to stand for 1 hour is designated as the pressure force after liquid immersion).

The present invention has been made based on the aforementioned knowledge, and for achieving the object, the separator for a valve-regulated lead acid battery of the present invention includes a sheet formed through wet papermaking mainly containing glass fibers, and the separator for a lead acid battery has an MD/CD strength ratio shown by the following expression (1) of 1.5 or less and a 60 kPa compressive force in liquid immersion shown by the following expression (2) of 65% or more:

MD/CD strength ratio=MD strength/CD strength (Expression 1)

(wherein the sheet formed through wet papermaking cut in a direction in parallel to the flow direction in the papermaking to a length of 15 cm and a width of 2.5 cm is designated as an MD specimen, and the sheet formed through wet papermaking cut in a direction perpendicular to the flow direction in the papermaking to a length of 15 cm and a width of 2.5 cm is designated as an CD specimen, which are measured with a tensile tester under conditions of a chuck distance of 10 cm and a tensile speed of 25 mm/min, and the maximum breaking strengths of the MD specimen and the CD specimen are designated as the MD strength and the CD strength respectively).

60 kPa compressive force in liquid immersion(%)=
(pressure force after liquid immersion/compressive force in liquid immersion)×100 (Expression 2)

(wherein 10 sheets of the sheet formed through wet papermaking of 10 cm×10 cm are designated as a specimen, which is sandwiched between a fixed plate and a movable plate, the movable plate is moved toward the fixed plate at a moving speed of 1 mm/min to compress the sheet under pressure of 60 kPa, which is designated as the compressive force in liquid immersion, and the pressure force of the specimen after immersing in a sulfuric acid solution having a specific gravity of 1.3 and allowing to stand for 1 hour is designated as the pressure force after liquid immersion).

In the separator for a lead acid battery of the present invention, the glass fibers may have an average fiber diameter of 1.5 μm or less.

In the separator for a lead acid battery of the present invention, the glass fibers may have an average fiber diameter of 1.0 μm or less.

In the separator for a lead acid battery of the present invention, the separator may not contain a binder component.

Advantageous Effects of Invention

The separator for a lead acid battery of the present invention mainly contains glass fibers, and thus can achieve the enhancement of the compressive force in liquid immersion and the pressure force maintenance rate in a state of good wettability to the electrolyte, and accordingly, the separator can suppress the losing the thickness (reduction of compressive force) thereof to prolong the cycle lifetime, as compared to the ordinary separators. Furthermore, due to the unnecessity of silica powder mixed therein, the separator has a lower density than the ordinary separators, so as to secure a larger electrolyte retention amount, which can suppress the decrease of the capacity of the battery.

Moreover, the separator that can have a prolonged cycle lifetime can be securely provided by the two parameters, i.e., the MD/CD strength ratio and the 60 kPa compressive force in liquid immersion, as indices.

DESCRIPTION OF EMBODIMENTS

The separator for a valve-regulated lead acid battery of the present invention includes a sheet formed through wet papermaking manly containing glass fibers, and has an MD/CD strength ratio shown by the following expression (1) of 1.5 or less and a 60 kPa compressive force in liquid immersion shown by the following expression of 65% or more.

While the glass fibers are not particularly limited, alkali-containing glass fibers are preferred, and glass fibers having an average fiber diameter of 0.5 to 4 μm are preferred.

The glass fibers are preferably formed of 100% of glass fibers with no binder or the like contained, but miscellaneous components that are unavoidably mixed in the production thereof are not completely excluded.

Examples of the papermaking method include a circular net paper machine and an inclined paper machine each having a forming part for forming paper having a dehydration device, which sucks glass fibers in water toward the paper machine wire to accumulate the glass fibers, and the use of an inclined paper machine is preferred from the standpoint of the control of the fiber orientation in this case, the jet-wire ratio of the paper machine is preferably 0.9 to 1.1 close to 1. The inclination angle of the paper machine is preferably as large as 10 to 20 degrees.

The MD/CD strength ratio shown by the expression (1) is as follows.

(1-1) The sheet formed through wet papermaking is cut to 15 cm×2.5 cm to prepare a specimen.

At this time, a specimen in parallel to the flow direction (MD) and a specimen perpendicular to the flow direction (CD) are collected.

(1-2) The specimens are subjected to a tensile test with a tensile tester under conditions of a chuck distance (measurement length) of 10 cm and a tensile speed of 25 mm/min, at which the maximum breaking strengths are read.

(1-3) Thereafter, the MD/CD strength ratio is calculated.

MD/CD strength ratio=MD strength/CD strength (Expression 1)

The 60 kPa compressive force is liquid immersion shown by the expression (2) is as follows.

(2-1) 10 sheets of the sheet formed through wet paper-making are cut into 10 cm×10 cm and are laminated to prepare a specimen.

(2-2) The specimen is sandwiched between pressure plates including a fixed plate and a movable plate of a horizontal compression tester (MODEL-2152DW, horizontal force tester, produced by Aikoh Engineering Co., Ltd.), and the movable plate is moved toward the fixed plate at a moving speed of 1 mm/min to compress the specimen under pressure of 60 kPa.

(2-3) The sheet formed through wet papermaking is it with a colored sulfuric acid (red) (specific gravity: 1.3) in an amount that are completely absorbed thereby, and confirmed for the pressure force after allowing stand for 1 hour, and the 60 kPa compressive force in liquid immersion is calculated by the following expression.

60 kPa compressive force in liquid immersion(%)= (pressure force after liquid immersion/compressive force in liquid immersion)×100    (Expression 2)

The cycle capability as an index for the evaluation of the separator for a lead acid battery is as follows.

(3-1) After the operation (2-3) above, the specimen is compressed by moving the movable plate toward the fixed plate from the thickness (T) in 60 kPa liquid immersion by 4% with respect to the thickness (T) at a speed of 0.5 mm/min, and then released to the thickness in 60 kPa liquid immersion.

(3-2) After repeating the operation (3-1) above 100 times, the pressure force at release is confirmed, and the cycle capability is calculated by the following expression.

Cycle capability(%)=(pressure force after release of compression/pressure force after liquid immersion)×100

EXAMPLES

Examples of the present invention will be described in detail along with comparative examples below, but the present invention is not limited to the example unless deviating from the substance thereof.

In the examples, the wet papermaking was performed with a paper machine having a papermaking angle of 12 degrees or more at a jet-wire ratio of 1.1 or less, whereas in the comparative examples, the wet papermaking was performed with a paper machine having a papermaking angle of 8 degrees or less at a jet-wire ratio of 1.1 or more. All the examples and the comparative examples were performed at a papermaking concentration of 0.3 wt % or less.

Example 1

Fine glass fibers having an average fiber diameter of 1.0 μm were dissociated in water with a pulper, and the glass fibers were subjected to wet papermaking with an inclined paper machine having an inclination angle of 20 degrees at a jet-wire ratio of 1, and dried to provide a separator for a valve-regulated lead acid battery having a thickness of 2.1 mm.

Example 2

Fine glass fibers having an average fiber diameter of 1.0 μm were dissociated in water with a pulper, and the glass fibers were subjected to wet papermaking with an inclined paper machine having an inclination angle of 20 degrees at a jet-wire ratio of 1, and dried to provide a separator for a valve-regulated lead acid battery having a thickness of 2.6 mm.

Example 3

Fine glass fibers having an average fiber diameter of 1.0 μm were dissociated in water with a pulper, and the glass fibers were subjected to wet papermaking with an inclined paper machine having an inclination angle of 15 degrees at a jet-wire ratio of 1, and dried to provide a separator for a valve-regulated lead acid battery having a thickness of 1.9 mm.

Example 4

Fine glass fibers having an average fiber diameter of 1.0 μm were dissociated in water with a pulper, and the glass fibers were subjected to wet papermaking with an inclined paper machine having an inclination angle of 12 degrees at a jet-wire ratio of 1.1, and dried to provide a separator for a valve-regulated lead acid battery having a thickness of 2.0 mm.

Comparative Example 1

Fine glass fibers having an average fiber diameter of 1.0 μm were dissociated in water with a pulper, and the glass fibers were subjected to wet papermaking with an inclined paper machine having an inclination angle of 8 degrees at a jet-wire ratio of 1.1, and dried to provide a separator for a valve-regulated lead acid battery having a thickness of 2.0 mm.

Comparative Example 2

Fine glass fibers having an average fiber diameter of 1.0 μm were dissociated in water with a pulper, and the glass fibers were subjected to wet papermaking with an inclined paper machine having an inclination angle of 8 degrees at a jet-wire ratio of 1.1, and dried to provide a separator for a valve-regulated lead acid battery having a thickness of 2.2 mm.

Comparative Example 3

Fine glass fibers having an average fiber diameter of 1.0 μm were dissociated in water with a pulper, and the glass fibers were subjected to wet papermaking with an inclined paper machine having an inclination angle of 5 degrees at a jet-wire ratio of 1.2, and dried to provide a separator for a valve-regulated lead acid battery having a thickness of 2.2 mm.

Comparative Example 4

Fine glass fibers having an average fiber diameter of 1.0 μm were dissociated in water with a pulper, and the glass fibers were subjected to wet papermaking with an inclined paper machine having an inclination angle of 5 degrees at a jet-wire ratio of 1.2, and dried to provide a separator for a valve-regulated lead acid battery having a thickness of 2.0 mm.

The separators of Examples 1 to 4 and Comparative Examples 1 to 4 obtained above each were measured for the thickness, the MD/CD strength ratio, the 60 kPa compressive force in liquid immersion, and the cycle capability in the following manner. The results are shown in Table 1.

[MD/CD Strength Ratio]

(1) The sheet formed through wet papermaking was cut to 15 cm×2.5 cm to prepare a specimen.

At this time, a specimen in parallel to the flow direction (MD) and a specimen perpendicular to the flow direction (CD) were collected.

(2) The specimens were subjected to a tensile test with a tensile tester under conditions of a chuck distance (measurement length) of 10 cm and a tensile speed of 25 mm/min, at which the maximum breaking strengths were read.

(3) Thereafter, the MD/CD strength ratio was calculated.

MD/CD strength ratio=MD strength/CD strength     (Expression 1)

[60 kPa Compressive Force is Liquid Immersion and Cycle Capability]

(1) 10 sheets of the sheet formed through wet papermaking were cut into 10 cm×10 cm and were laminated to prepare a specimen.

(2) The specimen was sandwiched between pressure plates including a fixed plate and a movable plate of a horizontal compression tester (MODEL-2152DW, horizontal force tester, produced by Aikoh Engineering Co., Ltd.), and the movable plate was moved toward the fixed plate at a moving speed of 1 mm/min to compress the specimen under pressure of 60 kPa.

(3) The sheet formed through wet papermaking was immersed with colored sulfuric acid (red) (specific gravity: 1.3) in an amount that are completely absorbed thereby, and confirmed for the pressure force after allowing stand for 1 hour, and the 60 kPa compressive force in liquid immersion was calculated by the following expression.

60 kPa compressive force in liquid immersion(%)=
(pressure force after liquid immersion/compres-
sive force in liquid immersion)×100     (Expression 2)

(4) Thereafter, the specimen was compressed by moving the movable plate toward the fixed plate from the thickness (T) in 60 kPa liquid immersion by 4% with respect to the thickness (T) at a speed of 0.5 mm/min, and then released to the thickness in 60 kPa liquid immersion.

(5) After repeating the operation (4) above 100 times, the pressure force at release was confirmed, and the cycle capability is calculated by the following expression.

Cycle capability(%)=(pressure force after release of
compression/pressure force after liquid immer-
sion)×100

It was conformed from Table 1 above that an excellent cycle capability was obtained with an MD/CD strength ratio of 1.5 or less and a 60 kPa compressive force in liquid immersion of 65% or more.

It was also confirmed from Table 1 above that by making the jet-wire ratio close to 1, in accumulating the fibers, at the time when one end of the glass fiber reached the surface of the forming wire, the fibers were not immediately pulled in the moving direction of the forming wire, and thus were subjected to papermaking with random fiber orientation, which brought about the enhancement of the pressure force.

It was also confirmed that by increasing the inclination angle in the papermaking, in accumulating on the surface of the forming wire, the proportion of fibers that were in the vertical direction with respect to the horizontal plane was be increased, resulting in the enhancement of the pressure force.

As described above, a separator for a lead acid battery having an MD/CD strength ratio of 1.5 or less and a 60 kPa compressive force in liquid immersion of 65% or more can be readily obtained by controlling the jet-wire ratio and the inclination angle of the forming wire. More specifically, by controlling the jet-wire ratio close to 1 and controlling the inclination angle of the forming wire to 10 degrees or more, a separator for a lead acid battery having an MD/CD strength ratio of 1.5 or less and a 60 kPa compressive force in liquid immersion of 65% or more can be obtained.

The invention claimed is:

1. A separator for a valve-regulated lead acid battery, comprising:

a sheet initially formed through wet papermaking substantially containing at least glass fibers, the sheet having a length, width, and thickness, the orientation of the glass fibers being randomized to allow for strengthening compressive force for the sheet, the glass fibers substantially overlapping with each other for suppressing a loss in the thicknesses of the glass fibers, the sheet having surface tension being dispersed in many directions for suppressing the lost in the thickness of the separator, and the proportion of glass fibers that are in the vertical direction is higher than the proportion of glass fibers that are in the non-vertical direction with respect to the horizontal plane of the sheet resulting in the enhancement of the pressure force of the sheet, wherein a paper machine controller is configured to control the jet-wire ratio and the inclination angle of the forming wire, so as to provide the resulting separator for a lead acid battery having an MD/CD strength ratio shown by the following expression (1) of 1.5 or less and a 60 kPa compressive force in liquid immersion

TABLE 1

| | | | Example | | | | Comparative Example | | | |
|---|---|---|---|---|---|---|---|---|---|---|
| Item | | Unit | 1 | 2 | 3 | 4 | 1 | 2 | 3 | 4 |
| Papermaking condition | Jet-wire ratio | — | 1 | 1 | 1 | 1.1 | 1.1 | 1.1 | 1.2 | 1.2 |
| | Inclination angle | degree | 20 | 20 | 15 | 12 | 8 | 8 | 5 | 5 |
| Characteristics of separator | Thickness (compressed at 20 kPa) | mm | 2.1 | 2.6 | 1.9 | 2.0 | 2.0 | 2.2 | 2.2 | 2.0 |
| | MD/CD strength ratio | — | 1.2 | 1.3 | 1.4 | 1.2 | 2.0 | 1.6 | 1.7 | 2.2 |
| | 60 kPa compressive force in liquid immersion | % | 73 | 80 | 69 | 69 | 64 | 60 | 62 | 62 |
| | Cycle capability | % | 38 | 55 | 44 | 38 | 33 | 28 | 23 | 30 | shown by the following expression (2) of 65% or more to secure a prolonged cycle lifetime for the separator:

$$\text{MD/CD strength ratio} = \text{MD strength/CD strength,} \quad \text{(Expression 1)}$$

wherein the sheet formed through wet papermaking cut in a direction in parallel to the flow direction in the papermaking to a length of 15 cm and a width of 2.5 cm is designated as an MD specimen, and the sheet formed through wet papermaking cut in a direction perpendicular to the flow direction in the papermaking to a length of 15 cm and a width of 2.5 cm is designated as a CD specimen, which are measured with a tensile tester under conditions of a chuck distance of 10 cm and a tensile speed of 25 mm/min, and the maximum breaking strengths of the MD specimen and the CD specimen are designated as the MD strength and the CD strength respectively, $$\text{60 kPa compressive force in liquid immersion(\%)} = \text{(pressure force after liquid immersion/compressive force in liquid immersion)} \times 100, \quad \text{(Expression 2)}$$

wherein 10 sheets of the sheet formed through wet papermaking are cut into 10 cm×10 cm and are laminated to prepare a specimen, which is sandwiched between a fixed plate and a movable plate, the movable plate is moved toward the fixed plate at a moving speed of 1 mm/min to compress the sheet under pressure of 60 kPa, which is designated as the compressive force in liquid immersion, and the pressure force of the specimen after immersing in a sulfuric acid solution having a specific gravity of 1.3 and allowing to stand for 1 hour is designated as the pressure force after liquid immersion.

2. The separator for a valve-regulated lead acid battery according to claim 1, wherein the glass fibers have an average fiber diameter of 1.5 μm or less.

3. The separator for a valve-regulated lead acid battery according to claim 2, wherein the glass fibers have an average fiber diameter of 1.0 μm or less.

4. The separator for a valve-regulated lead acid battery according to claim 1, wherein the separator contains no binder component.

5. The separator for a valve-regulated lead acid battery according to claim 1, which further includes controlling the jet-wire ratio close to 1, and controlling the inclination angle of the forming wire to 10 degrees or more.

* * * * *